May 4, 1937.  C. B. KETTRING  2,079,509

COMBINATION FISHING LURE

Filed Dec. 3, 1935

Chauncey B. Kettring, INVENTOR

BY Victor J. Evans & Co.

ATTORNEY

Patented May 4, 1937

2,079,509

UNITED STATES PATENT OFFICE 2,079,509

COMBINATION FISHING LURE

Chauncey B. Kettring, Montezuma, Ohio

Application December 3, 1935, Serial No. 52,721

2 Claims. (Cl. 43—35)

This invention relates to fish bait of the artificial type, and its general object is to provide a fishing lure primarily designed for trolling and casting, that consists of a spinner, weedless hooks and a plug combined in a single unit and the hooks which are normally held concealed, are released for action when a fish strikes, with the result my lure not only has a tendency to be more attractive to fish but fear of the hooks becoming entangled or caught in grass and on objects, while the lure is in use or being carried, is eliminated.

A further object of the invention is to provide a fishing lure of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which.

Figure 1:
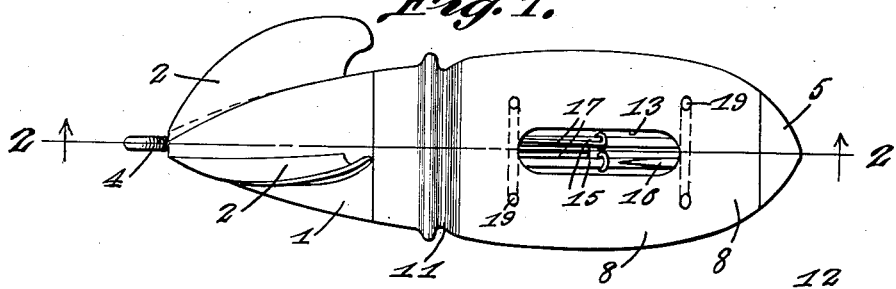
Figure 1 is a side elevation of the fishing lure which forms the subject matter of the present invention.
Figure 2:
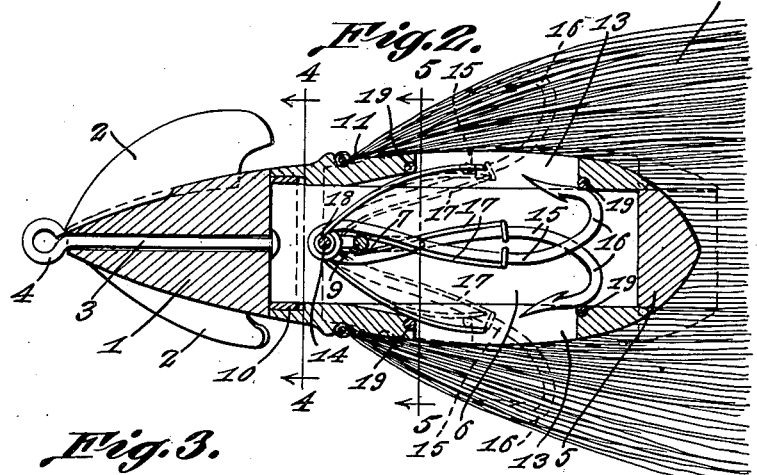
Figure 2 is a sectional view taken approximately on line 2—2 of Figure 1, looking in the direction of the arrows, with the hooks concealed and held accordingly in full lines, and released in dotted lines.
Figure 3:
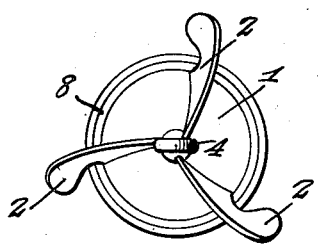
Figure 3 is a front view thereof.

Referring to the drawing in detail, it will be noted that my lure in its entirety is of torpedo shape and includes a body provided with a nose 1 of conical formation having slots arranged therein for the purpose of receiving blades or vanes 2 that extend from adjacent the rear end of the nose to the apex or pointed end thereof, as best shown in Figure 2. The vanes are curved in spiral formation as indicated in Figure 3, and have reduced rear end portions disposed in spaced relation with respect to the nose.

The nose 1 which is solid has extending longitudinally therethrough a bore having mounted therein a shaft 3 which has a head at its rear end and an eye 4 at its opposite end, the latter being adapted to receive a line, as will be apparent. The shaft is loosely mounted in the bore, consequently it will be obvious that the device in its entirety will rotate thereon.

Formed with or otherwise secured to the rear end of the nose is a core 5 which is hollow for its major portion in that a relatively large recess 6 extends longitudinally thereof, for substantially its entire length, but terminates adjacent its rear end, the latter being of conical formation, as shown.

Disposed at right angles with respect to the recess 6 and arranged in opposed relation with respect to each other are slots 7 extending longitudinally of the core, and mounted for slidable movement on the core and limited accordingly for the length of the slots 7 is a shell 8 held on the core by a pin 9, the latter being fixed to the shell and movable in the slots 7, consequently the ends of the slots limit the movement of the shell.

Figure 6:
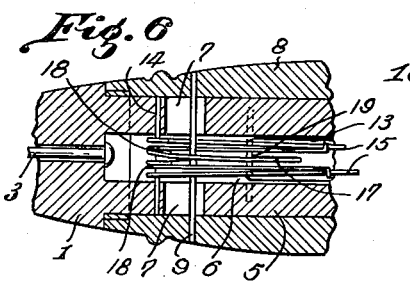
Figure 6 is a longitudinal sectional view taken through a fragmentary portion of the lure, at right angles to Figure 2, and with parts in elevation.
Figure 4:
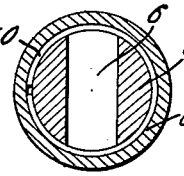
Figure 4 is a sectional view taken approximately on line 4—4 of Figure 2, looking in the direction of the arrows.

The forward end of the shell is of the same diameter as the rear end of the nose to be flush therewith, and surrounding the core at its juncture with the nose is a band 10 for disposal between the core and the shell, the band being receivable in a groove in the forward end of the shell, as best shown in Figure 6.

The shell is provided with an annular groove 11 on the outer surface thereof to receive attaching means for hair, feathers or the like 12 that extends rearwardly from the attaching means, for disposal about the shell.

Figure 5:
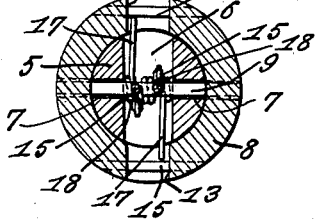
Figure 5 is a sectional view taken approximately on line 5—5 of Figure 2, looking in the direction of the arrows.
Figure 7:
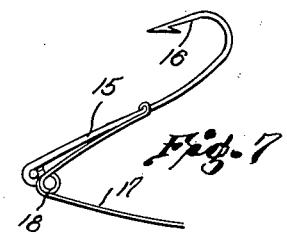
Figure 7 is a detail perspective view of one of the hooks and its spring.

The shell has arranged longitudinally therein elongated openings 13 for registration with the recess 6, and bridging the recess adjacent its forward end is a pin 14 which has journaled thereon the eyed ends of the shanks 15 of hooks 16, the latter being of the barbed type as shown, and are movable through the elongated openings 13, through the instrumentality of springs 17, there being a spring for each hook, and the springs which are formed from resilient wire each include a pair of arms as best shown in Figure 7, one of which is fixed to the shank of its hook, while the other is free and contacts the inner edge of the adjacent opening 13, in order that the hooks will be under tension or spring pressed for disposal through the openings 13. The springs 17 are carried by or pivotally secured to the pin 14, in that the arms merge into an eye 18 which surrounds the pin, as best shown in Figure 5.

The ends of the openings 13 are reinforced by pins 19 which act as bearing surfaces for the arms of the springs, and the hooks.

The hooks are of a length, to extend beyond the rear ends of the openings 13, when the shell is moved forwardly to the full line position of Figure 2, consequently the portion of the shell rearwardly beyond the openings will contact the hooks and retain them normally within the shell, as shown in full lines in Figure 2. However, when the shell is moved rearwardly the point of contact of the shell with the hooks is moved out of the path thereof, which will result in the springs forcing the hooks through the openings 13, or to the dotted line position of Figure 2, therefore it will be obvious that when a fish strikes my lure, the shell will be moved rearwardly and thereby automatically release the hooks.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A fish lure comprising a body, a conical nose included in said body, a core extending rearwardly therefrom and being substantially hollow, a shell having longitudinal openings arranged therein and mounted for sliding movement on the core, spring pressed hooks pivotally mounted in the core and held concealed by contacting the shell in one position of the latter, and said shell being movable to another position to release the hooks for disposal through the openings, line connecting means for the lure and extending through the nose with the latter mounted for rotation thereon, and vanes secured to the nose.

2. A fish lure comprising a body, a nose included in the body, a core secured to and extending from the nose and having a recess extending therethrough substantially the length thereof, a shell mounted for movement on the core and having opposed elongated openings therein, spring pressed hooks mounted for pivotal movement in the core for disposal through the recess and openings, said shell holding the hooks normally within the core and shell when the latter is in one position and releasing the hooks when moved to another position, reinforcing means for the shell and arranged in the path of the hooks and springs thereof, hackle secured to the shell for disposal over the openings thereof, line connecting means carried by the nose with the latter mounted for rotation thereon, and means for rotating the lure and carried by the nose.

CHAUNCEY B. KETTRING.